March 27, 1951     J. E. BUXTON     2,546,940
ENGINE STARTER GEARING
Filed July 21, 1949
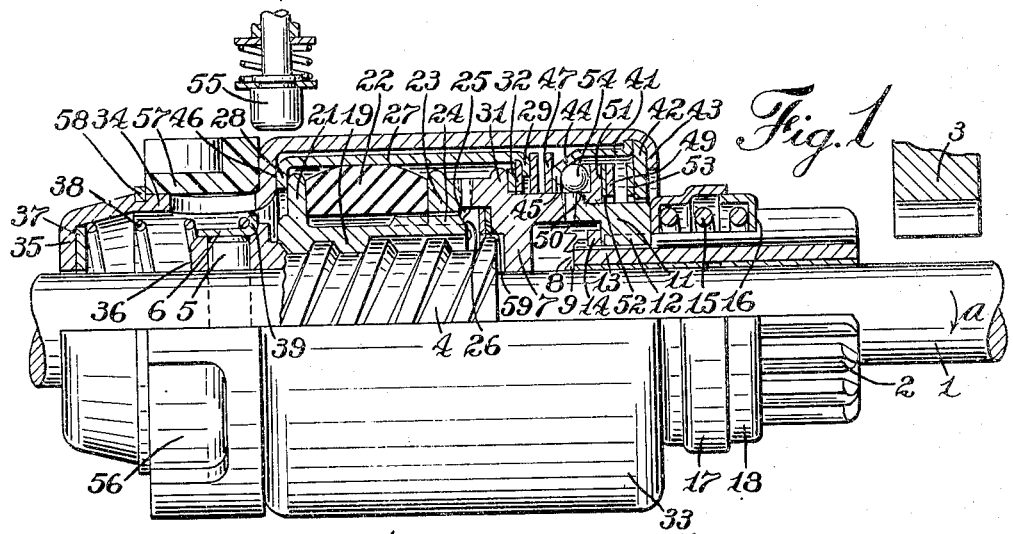
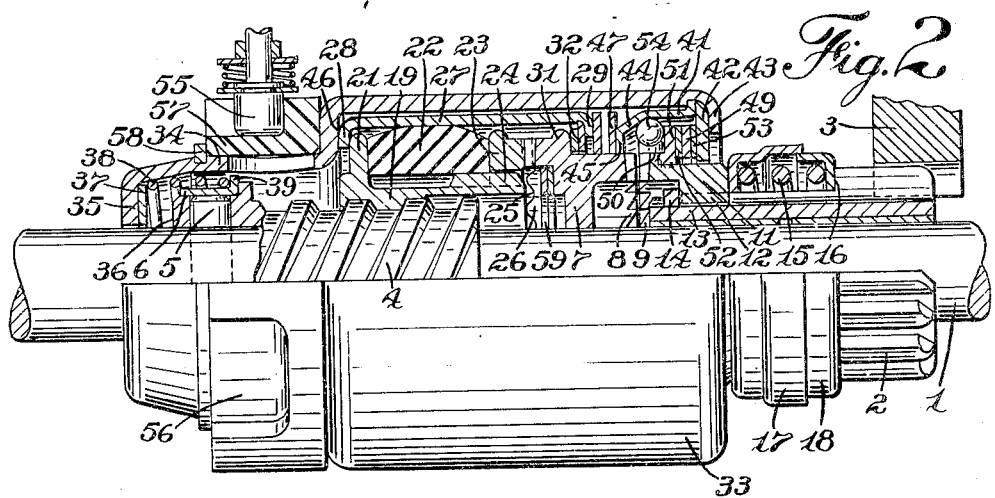
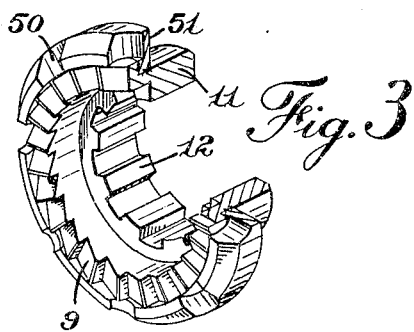
INVENTOR.
James E. Buxton
BY
Clinton L. James
ATTORNEY
WITNESS:
Esther M. Stockton.

Patented Mar. 27, 1951

2,546,940

UNITED STATES PATENT OFFICE 2,546,940

ENGINE STARTER GEARING

James E. Buxton, Elmira, N. Y., assignor to Bendix Aviation Corporation, Elmira Heights, N. Y., a corporation of Delaware Application July 21, 1949, Serial No. 106,072

6 Claims. (Cl. 74—7)

The present invention relates to engine starter gearing and more particularly to that type of drive which automatically connects the starting motor to the engine and maintains said connection when the motor is energized, and disconnects when the motor is deenergized.

It is an object of the invention to provide a novel starter drive of the above character which is efficient and reliable in operation, simple in construction, and adapted to overrun at high speed quietly and without danger of transmitting torque back to the starting motor.

It is another object to provide such a device including a dental type of overrunning clutch, with yielding means normally holding the clutch closed and centrifugal means for holding the clutch open when the driven member is rotated above a predetermined speed by the engine.

Further objects and advantages will be apparent from the following description taken in connection with the accompanying drawing in which:

Fig. 1 is a side elevation partly broken away and in section showing a preferred embodiment of the invention with the parts in normal or idle position;

Fig. 2 is a similar view showing the parts in the positions assumed after the engine starts and causes the pinion to overrun the drive while remaining in mesh with the engine gear;

Fig. 3 is a detail in perspective, partly in section, of the driven overrunning clutch member of the drive.

In Fig. 1 of the drawing there is illustrated a power shaft 1 which is preferably the extended armature shaft of a starting motor not illustrated. A pinion 2 is slidably journalled on the power shaft for longitudinal movement into and out of mesh with a gear 3 of the engine to be started. Means for actuating the pinion 2 from the power shaft is provided comprising a screw shaft 4 fixedly mounted on the power shaft 1 as by means of a cross pin 5 which is retained therein by a thimble 6.

A driving overrunning clutch member 7 is also slidably journalled on the power shaft 1 and is provided with teeth 8 adapted to engage with teeth 9 of a driven overrunning clutch member 11 splined, as indicated at 12, on the extended hub 13 of the pinion 2. Driven clutch member 11 is retained on the hub of the pinion by means of a lock ring 14, and a compression spring 15 is located between the driven clutch member 11 and a shoulder 16 on the pinion so as to normally hold the pinion in extended relation with respect to the driven clutch member. The spring 15 is preferably housed in a telescopic casing 17, 18 in order to prevent the spring from being thrown outwardly by centrifugal force when the pinion is rotating at high speed.

A yielding driving connection for the driving overrunning clutch member 7 is provided comprising a nut member 19 threaded on the screw shaft 4 and having a radial flange 21 against which is seated a cylindrical block 22 of elastically deformable material such as rubber. A driving slip coupling member 23 is splined on the nut as indicated at 24 in abutting relation with the rubber block 22, and is provided with undulatory axial projections 25 adapted to engage with similar projections 26 on the driving overrunning clutch member 7. Means for holding the nut, the driving slip coupling member 23, and driving overrunning clutch member 7 in unitary relation with the rubber block 22 under initial compression is provided in the form of a sleeve member 27, one end of which is provided with an inwardly extending flange 28 bearing against the flange 21 of nut 19, while the other end 29 is turned in to form an abutment for a flange 31 on the driving overrunning clutch member 7, thrust washers 32 being preferably interposed there-between.

A barrel member 33 is arranged to enclose the drive and provide a stop means for defining the meshed position of the pinion. For this purpose one end of the barrel 33 is reduced in diameter as shown at 34 and provided with a stop flange 35 arranged to engage the abutment 36 formed by the end of the screw shaft 4, to limit the longitudinal movement of the barrel; a thrust washer 37 being preferably interposed between the abutting surfaces. An anti-drift spring 38 seated at one end of the thimble 6 against an out-turned flange 39 thereof, and bearing at its other end against the thrust washer 37, normally maintains the barrel, and consequently the associated parts of the drive, in idle position as defined by the abutment of the end of the nut 19 against the end of the threads of the screw shaft 4 as illustrated in Fig. 1.

The open end of the barrel 33 has mounted therein an annular member 41 which is clamped against a thrust ring 42 by a lip 43 of the barrel which is spun or crimped over the thrust ring. The annular member 41 has an intermediate inclined or truncated portion 44, and a radially inward extending flange 45 which is slidably journalled on the driving overrunning clutch member 7. In order to normally retain the sleeve 27 with its associated parts in its normal position with the flange 28 thereof against the shoulder 46 formed by the reduction in diameter of the barrel 33, a single turn flat spring member 47 is interposed between the flange 45 of the annular member 41 and the end 29 of the sleeve 27.

The teeth 8 and 9 of the driving overrunning clutch member 7 and the driven overrunning clutch member 11 are yieldingly urged into engagement as illustrated in Fig. 1 by a flat spring member 49 located between the thrust ring 42 and a radial shoulder 51 on the driven overrunning clutch member, thrust washers 52 and 53 being also interposed as spacing means.

According to the present invention, means are provided for overcoming the pressure of the clutch spring 49 and holding the overrunning clutch members completely disengaged from each other when the pinion and driven overrunning clutch member are rotated at high speed after the engine starts. For this purpose, ball members 54 are seated in radial sockets 50 (Fig. 3) formed in the driven overrunning clutch member 11 in position to bear against the inclined portion 44 of the annular member 41. When the balls 54 move radially outward by centrifugal force, they cam apart the overrunning clutch members until the clutch teeth 8, 9 are disengaged, as shown in Fig. 2.

Means for maintaining the pinion 2 meshed with the engine gear 3 as long as the starting motor is energized is provided in the form of a plunger 55 which is moved by closure of the starting switch into engagement with a socket 56 in a ring 57 of suitable material such as plastic freely journalled on the reduced portion 34 of the barrel and retained against the shoulder 46 thereof by a lock ring 58. Since this structure is fully illustrated and described in the patent to Oliver No. 2,444,109 further description thereof is deemed unnecessary.

In operation, starting with the parts in the positions illustrated in Fig. 1, energization of the starting motor causes rotation of the power shaft 1 in the direction of the arrow (a) whereby the nut 19 is traversed to the right, which longitudinal motion is transmitted through the rubber block 22 and slip coupling member 23 to the driving overrunning clutch member 7, and through the spring 47 and annular member 41 to the barrel 33. The longitudinal movement of the driving overrunning clutch member 7, is transmitted to the driven clutch member 11, and through meshing spring 15 to the pinion 2, causing it to move into mesh with the engine gear 3. If tooth abutment should occur between the pinion 2 and the gear 3, the spring 15 is compressed permitting the rotary component of the force applied by the screw shaft 4 to the nut 19 to build up sufficiently to index the pinion 2 into proper registry with the teeth of the engine gear 3 whereupon the spring 15 snaps the pinion into initial mesh with the engine gear.

When the flange 35 of the barrel 33 is stopped by the shoulder 36 at the end of the screw shaft 4, the longitudinal movement of the pinion is arrested, and the pinion is thereupon rotated by means of the interengaging projections 25, 26 of the preloaded slip coupling and the teeth 8, 9 of the overrunning clutch 7, 11. At this time, the slip coupling is additionally loaded by the further compression of the rubber block 22 by longitudinal movement of the nut 19 after the longitudinal movement of the driving overrunning clutch member 7 has been arrested by the barrel 33.

This compression of the rubber block 22 is preferably limited by thrust washers 59 interposed between the end of the nut 19 and the driving overrunning clutch member 7 whereby excessive shock loads on the drive may be relieved by the slipping of said coupling. At the same time, the overrunning clutch members 7, 11 are compressed by the screw jack action of the screw shaft 4 and nut 19, the clutch spring 49 being pressed flat between the washers 52, 53, the spring 47 yielding sufficiently to permit this action.

Closure of the starting switch causes the plunger 55 to be pressed against the barrel 33 so that when the barrel has traversed to the right the plunger enters a socket 56 in the ring 57, thus preventing retrograde movement of the barrel 33 as long as the starting switch remains closed.

When the engine starts, the acceleration of the pinion 2 by the engine gear 3 is transmitted back through the clutch members 11, 7 and the yielding driving connection to the nut 19 which accordingly threads itself back on the screw shaft 4 until the teeth 8, 9 of the clutch members 7, 11 are permitted to overrun, thus allowing the pinion and driven clutch member 11 to overrun the drive. The retrograde movement of the barrel 33 is at this time arrested by the engagement of the plunger 55 with the ring 57 as shown in Fig. 2.

The rapid rotation of the pinion 2 by the engine gear 3 causes the balls 54 to move radially outward, thus further compressing the clutch spring 49 and moving the clutch teeth 8, 9 out of engagement with each other so that the pinion and driven clutch member 11 overrun freely and quietly without any noise or wear of the clutch teeth.

When the operator opens the starting switch, the plunger 55 is withdrawn from its engagement with the ring 57, and the anti-drift spring 38 is thereupon effective to return the barrel 33 and the movable parts of the drive to their normal position, disengaging the pinion 2 from the engine gear 3. When the rotation of the pinion 2 is thus retarded, the balls 54 are returned to their idle positions by the clutch spring 49 as it engages the clutch teeth 8, 9 as illustrated in Fig. 1.

Although but one embodiment of the invention has been shown and described in detail, it will be understood that other embodiments are possible, and that changes may be made in the design and arrangement of the parts without departing from the spirit of the invention.

I claim:

1. In an engine starter drive, a power shaft, a pinion journalled thereon for longitudinal movement into and out of mesh with a gear of the engine to be started, means for actuating the pinion from the power shaft including a pair of dental overrunning clutch members, yielding means urging the clutch members into engagement, and centrifugal means responsive to overrunning of the driven clutch member above a predetermined speed, for separating the clutch members and holding them apart.

2. An engine starter drive as set forth in claim 1, including further a splined connection between the driven clutch member and the pinion, a compression spring urging said clutch member and pinion apart, and means positively limiting the extension of the pinion by said spring.

3. An engine starter drive as set forth in claim 1 including further, means including a barrel member forming a stop to limit the meshing movement of the pinion, and said clutch-separating means including a plurality of balls carried by the driven clutch member, and an annular member fixed in the barrel, having an inclined surface cooperating with the balls to move said driven clutch member in the barrel away from the driving clutch member as the balls move radially outward by centrifugal force.

4. An engine starter drive as set forth in claim 3, in which the means for actuating the pinion includes a screw shaft fixed on the power shaft, a nut threaded on the screw shaft, and means for yieldingly transmitting the longitudinal and rotary movement of the nut to the driving clutch member to force it against the driven clutch member by the screw-jack action of the nut and screw shaft.

5. In an engine starter drive, a power shaft, a screw shaft fixed thereon, a nut threaded on the screw shaft, a driving overrunning clutch member slidably journaled on the power shaft, a yielding driving connection from the nut to the driving clutch member, a pinion slidably journaled on the power shaft for movement into and out of mesh with a gear of the engine to be started, a driven overrunning clutch member non-rotatably mounted on the pinion, means including a barrel member enclosing the drive and forming a stop to limit the longitudinal movement of the driven clutch member in the direction to mesh the pinion with the engine gear, an annular member fixedly mounted in the barrel having an inclined surface and a flange forming an abutment, a spring urging the driven clutch member toward said abutment, and a plurality of balls carried by the driven clutch member with freedom for radial movement into engagement with the inclined surface of the annular member.

6. An engine starter drive as set forth in claim 5 including further a compression spring between the driving overrunning clutch member and the abutment of the annular member.

JAMES E. BUXTON.

REFERENCES CITED

The following references are of record in the file of this patent:

UNITED STATES PATENTS

| Number | Name | Date |
|---|---|---|
| 2,455,339 | Miller | Nov. 30, 1948 |